BROWN & BARTLETT.
Harvester.
No. 1,111.
Reissued Jan. 1, 1861.
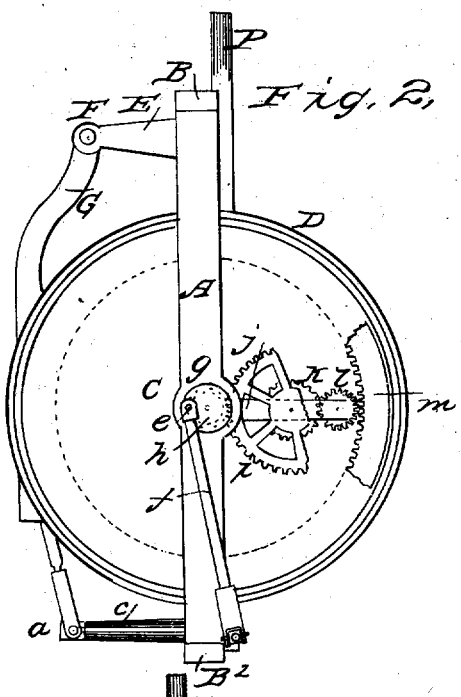
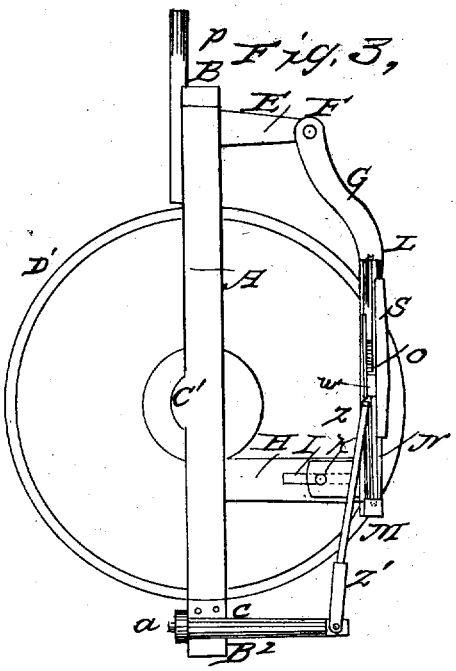
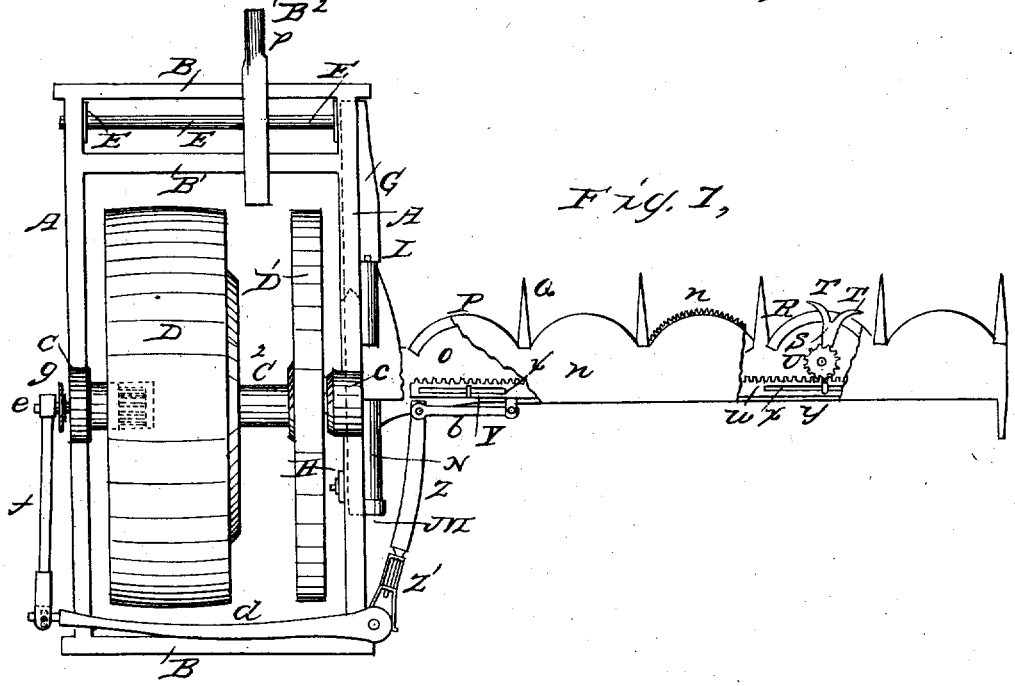
N. PETERS, Photo-Lithographer, Washington, D. C.

UNITED STATES PATENT OFFICE.

J. E. BROWN AND S. S. BARTLETT, OF WOONSOCKET, RHODE ISLAND.

IMPROVEMENT IN GRAIN AND GRASS HARVESTERS.

Specification forming part of Letters Patent No. 12,121, dated January 2, 1855; Reissue No. 1,111, dated January 1, 1861.

*To all whom it may concern:*

Be it known that we, JOHN E. BROWN and STEPHEN S. BARTLETT, both of Woonsocket, in the county of Providence and State of Rhode Island, have invented a new and useful Improvement in Grain and Grass Harvesters; and we do hereby declare that the following is a full, clear, and exact description of the same, reference being had to the annexed drawings, making a part of this specification, in which—

Figure 1 is a plan or top view. Fig. 2 is an elevation of the left-hand side. Fig. 3 is an elevation of the right-hand side.

In the drawings, A A are the side rails of the carriage, connected together by the bars B B′ B″, so as to form a frame to which the other parts of the machine are attached or connected. The rails A A′ are provided with boxes C C′, which are perforated for the axle C² of the wheels D and D′, which wheels support the carriage, and upon which the machine is moved and operated. There are two stands, E E, fastened to the rails A A′, near their forward ends, which stands are perforated for the shaft F, which turns in them, and to which shaft the vibrating bar G is fastened, as represented, and as it vibrates it turns the shaft F. The stand H is fastened to the rail A′ behind the axle, and is provided with a slot, I, in which slot the stud J, fastened in the stand K, traverses, which stand K is fastened to the rear end of the vibrating bar G. The bar G may be made in the form represented, or in such other form as may be desirable, and provided with a projection at L and a stand at M for the pivot of the rock-shaft N, to which the cutter-stock O is fastened firmly, as required. By the construction and arrangement above described, the cutter-stock is allowed to traverse on the surface of the ground, and to rise and fall of its own accord and accommodate itself to the surface of the ground and to such undulations or inequalities as it may pass over. The front of the cutter-stock O is made in the form represented—that is, with a series of curves, P, and alternate points Q—or in such other form as may be desirable. The tops of the curves P are faced with a metal plate or circular knife, R, over which the vibrating knife S traverses to sever the stalks of grain or grass harvested. The knife S has two crooked blades, T T, each of which blades is double or two-edged, so that the outer edges of both knives cut when it or they are vibrated in each direction, and the inner edges cut only when they move in the direction that each knife points to respectively. The knife S is fastened to the pinion U, which turns on the stud V, fastened into the cutter-stock O, when it (the pinion) is acted upon by the rack W, which rack is provided with slots X X for the studs Y Y, upon which it traverses, the studs Y Y being fastened into the cutter-stock O. The rack W is traversed by the arm Z, fastened to the rock-shaft *a*, and connected to the rack by the link *b*, as represented. The arm Z is made with a round shank fitted to a socket, Z′, so as to allow the arm Z to turn when the cutter-stock is raised and lowered. The rock-shaft *a* turns in the tubular stand *c*, fastened to the rail A′, and is turned by the arm *d*, which is fastened to it, and connected to the crank-pin *e* by the rod *f*, as represented.

The box C is made hollow through the rail and a short distance within it to make room for the tube fastened to the disk *g*, which carries the crank-pin *e*. The inner end of the tube is provided with a pinion, *h*, which is acted upon by the wheel *i*, which turns on a stud in the stand *j*, fastened to the inner end of the box C. The wheel *i* has the pinion *k* fastened to it, which is turned by the stud-pinion *l*, which turns on a stud in the stand *j*, and is operated by the inverted gear *m* on the interior of the wheel D. The tube fastened to the disk *g* turns on the end of the shaft of the wheel D, which extends into the box C for that purpose.

The cutter-stock O and rack W are covered with a casing, *n*, of sheet metal or other material, the front portion of the casing being curved to correspond or nearly correspond with the front of the cutter-stock O. The front edge of this casing *n* is notched, so as to form teeth, as represented at *n′*, which teeth are just above the knives, and support the stalks of grass and grain above the knives while they are cut, the roots affording sufficient support below the knives, so that teeth or fingers are unnecessary there. A section of a tongue or pole is represented at *p*, fastened to the bars B and B′. To this pole the animals may be harnessed in some convenient manner to draw the machine.

To operate the machine the team is hitched to the pole *p*, and as the machine is drawn forward the wheels D and D′ roll upon the ground, and the inverted gear *m*, fastened to the wheel D, turns the pinion *l* to operate the pinion *k*, wheel *i* and pinion *h* to turn the disk *g*, and crank-pin *e*, which traverses the rod *f*, vibrating the arm *d*, rock-shaft *a*, and arm Z, which traverses the rack W by the link *b*, and operates the pinion U, so as to vibrate the knife or knives fastened to it and cut the grass or grain as required.

The advantages of our improvement are, first, that both ends of the cutter-stock travel upon the ground, and its position is not disturbed by either of the wheels passing over stones or hillocks, or sinking into hollows; consequently it harvests the grass very closely and saves more than most of the machines heretofore used; second, the cutter-bar being hinged to the bar G, the attendant can raise it with facility to pass stones, stumps, or other obstructions, without tipping the carriage; consequently it can be done with less labor. Besides, the cutter-stock may be raised and secured by a rope, so that the machine may travel upon its own wheels from one field or plantation to another, whereby saving the labor of loading it on and unloading from another vehicle. It is also found in practice to be a great advantage to make the exterior portion of the knives sharp, so as to cut each way at each vibration. The teeth above the knife support the stalks of grass and grain while they are severed by the knife, and these teeth also prevent the knife from carrying so many leaves in between the stock and case as it would do if there were no teeth upon the case to prevent it.

We contemplate that the bar G may be fastened permanently to the carriage, so as not to vibrate, and the cutter-stock allowed to vibrate; or that the cutter-stock may be fastened permanently to the bar G and the bar G allowed to vibrate.

What we claim as our invention in the above-described machine for harvesting grain and grass is—

1. Hanging or hinging the bar G to the carriage, so as to vibrate, substantially as described, in combination with the hanging or hinging of the cutter-stock to the bar G, substantially as described, so that the cutter-stock may vibrate and accommodate itself to any undulations in the surface of the ground, and so that it may be raised by the attendant to pass stones, stumps, or other obstructions without tipping the carriage.

2. The use of a single draw-bar attached by yielding and hinged connection at the side of the carriage or main frame, in combination with the hinged or rigidly-connected cutter-stock or finger-bar, substantially as described, for the purpose specified.

JOHN E. BROWN.
STEPHEN S. BARTLETT.

Witnesses:
JAMES LAIRD,
LEWIS A. TUCKER.